United States Patent
McCormick et al.

(10) Patent No.: US 9,141,266 B2
(45) Date of Patent: Sep. 22, 2015

(54) CUSTOMIZABLE VEHICLE FLEET REPORTING SYSTEM

(71) Applicants: Sean Ali'i McCormick, Los Angeles, CA (US); Jason Mathew Koch, Huntington Beach, CA (US); Ralph James Mason, Christchurch (NZ); William Robert Elliot, Christchurch (NZ)

(72) Inventors: Sean Ali'i McCormick, Los Angeles, CA (US); Jason Mathew Koch, Huntington Beach, CA (US); Ralph James Mason, Christchurch (NZ); William Robert Elliot, Christchurch (NZ)

(73) Assignee: TELOGIS, INC., Aliso Viejo, CA (US)

( * ) Notice: Subject to any disclaimer, the term of this patent is extended or adjusted under 35 U.S.C. 154(b) by 182 days.

(21) Appl. No.: 13/645,364

(22) Filed: Oct. 4, 2012

(65) Prior Publication Data
US 2013/0104064 A1  Apr. 25, 2013

Related U.S. Application Data

(60) Provisional application No. 61/543,232, filed on Oct. 4, 2011.

(51) Int. Cl.
| | |
|---|---|
| G06F 3/0481 | (2013.01) |
| G06F 9/44 | (2006.01) |
| G06F 17/24 | (2006.01) |
| G07C 5/08 | (2006.01) |
| G08G 1/00 | (2006.01) |
| G06Q 10/06 | (2012.01) |
| G06Q 10/10 | (2012.01) |
| G06Q 10/00 | (2012.01) |
| G06F 3/0484 | (2013.01) |

(52) U.S. Cl.
CPC .......... *G06F 3/0484* (2013.01); *G06Q 10/0631* (2013.01); *G06F 3/0481* (2013.01); *G06F 9/4443* (2013.01); *G06F 17/243* (2013.01); *G06F 17/248* (2013.01); *G06Q 10/06* (2013.01); *G06Q 10/103* (2013.01); *G06Q 10/20* (2013.01); *G07C 5/0808* (2013.01); *G07C 5/0816* (2013.01); *G07C 5/0841* (2013.01); *G08G 1/20* (2013.01)

(58) Field of Classification Search
CPC ... G06F 3/0481; G06F 9/4443; G06F 17/243; G06F 17/248; G07C 5/0808; G07C 5/0816; G07C 5/0841; G08G 1/20; G06Q 10/06; G06Q 10/103; G06Q 10/20
USPC .......... 701/29.1, 29.3, 31.4, 31.5, 32.1, 33.4; 705/13, 301, 305, 337, 338, 341; 715/222, 765
See application file for complete search history.

(56) References Cited

U.S. PATENT DOCUMENTS 7,640,496 B1 * 12/2009 Chaulk et al. ............... 715/243
2003/0033179 A1 * 2/2003 Katz et al. .................... 705/7

(Continued)

OTHER PUBLICATIONS

International Search Report and Written Opinion issued in application No. PCT/US12/58796 on Dec. 17, 2012.

*Primary Examiner* — Eric J Bycer
(74) *Attorney, Agent, or Firm* — Knobbe, Martens, Olson & Bear LLP

(57) ABSTRACT

Customization features for providing users with the ability to customize various aspects of a vehicle management system are described. These customization features can include functionality for generating custom reports based on vehicle parameters, including diagnostic codes. The customization features can also include features for customizing alerts based on vehicle parameters and features for customizing nomenclature in the vehicle management system.

19 Claims, 19 Drawing Sheets

(56) References Cited

U.S. PATENT DOCUMENTS

| | | |
|---|---|---|
| 2004/0254698 A1* | 12/2004 | Hubbard et al. ............... 701/35 |
| 2005/0004947 A1* | 1/2005 | Emlet et al. ................ 707/104.1 |
| 2005/0171692 A1* | 8/2005 | Hamblen et al. ............. 701/209 |
| 2007/0288890 A1 | 12/2007 | Wells |
| 2008/0084334 A1* | 4/2008 | Ballew ........................ 340/990 |
| 2009/0079555 A1* | 3/2009 | Aguirre De Carcer et al. ............ 340/441 |
| 2010/0274479 A1* | 10/2010 | Sheha et al. .................. 701/202 |
| 2011/0040440 A1* | 2/2011 | de Oliveira et al. ............. 701/30 |
| 2011/0093306 A1* | 4/2011 | Nielsen et al. ............... 705/7.13 |
| 2011/0202591 A1 | 8/2011 | Reis et al. |
| 2011/0208384 A1 | 8/2011 | Tarte |

\* cited by examiner

Drivers [x] | Map [x] | Terminology [x]

Replace Once | Replace Everywhere

Find Terms to Replace

| driver | | Search | ⊕ Replace Term |

| Original Term | Replacement Term | Path |
|---|---|---|
| \<b\>total Route Time\</b\>should equal End Time - Start Time\<br /\>\<b\>Total Route Time\</b\>should... | | Reports > Notes > |
| (no drivers found for this date range) | | Pages > Pack > |
| add and remove drivers from public teams | | Right > Name > Teams > |
| add drivers | | Right > Name > Drivers > |

← ◄ | Page [1] of 1 | ► → | Displaying 1 - 4 of 73

Current Replacements

| ✎ Edit | ⊖ Delete |

┌─────────────────────────────────────┐
│ Replace Term                    [x] │
│                                     │
│ Replacement Term: [_____]    │
│                          ╲_1310     │
│ Original Term: and drivers          │
│                                     │
│ Path: Right > Name > Drivers >      │
│                                     │
│         [ Save ]    [ Cancel ]      │
│            ╲_1320                   │
└─────────────────────────────────────┘

| Original Term | | Path |

← ◄ | Page [1] of 1 | ⟳

| | | Yellow Alert | | | Red Alert | | |
|---|---|---|---|---|---|---|---|
| Name: | Enabled | Inverted | Minimum | Maximum | Enabled | Inverted | Minimum | Maximum |
| Acceleration Violations | No | | *1810* | | No | | *1812* | |
| Battery Voltage | No | | | | No | | | |
| Odometer | No | | | | No | | | |
| Refrigeration Tempera... | No | | | | No | | | |
| Vehicle Speedometer | | | | | | | | |

FIG. 18

| Analog | Digital | | | | | |
|---|---|---|---|---|---|---|
| Filter: | Filter | | | Edit Yellow Alert | Edit Red Alert | |
| | | | Yellow Alert | | Red Alert | |
| Name: | | Enabled | Inverted | Enabled | Inverted | |
| Warm Up Catalyst Efficiency Below Threshold (Bank 2) | | No | No | No | No | |
| Water In Fuel | | No | No | No | No | |

1910 (Yellow Alert Inverted), 1912 (Red Alert Inverted), 1920

Page 1 of 1

Save

FIG. 19

CUSTOMIZABLE VEHICLE FLEET REPORTING SYSTEM

RELATED APPLICATION

This application claims the benefit of priority under 35 U.S.C. §119(e) of U.S. Provisional Patent Application No. 61/543,232, filed on Oct. 4, 2011, entitled "Vehicle Fleet Management System," the disclosure of which is hereby incorporated by reference in its entirety.

BACKGROUND

Specialized fleet management software is often used to manage fleets of vehicles, such as trucks or taxis. Typical fleet management systems include functionality for mapping and tracking vehicles. Vehicle tracking is facilitated by communicating with tracking devices installed in vehicles, which typically obtain location and speed information using a global positioning system (GPS). The tracking devices can upload the location and speed information to the fleet management system. In turn, the fleet management system generates a user interface accessible by a fleet administrator to determine vehicle locations, routes, speeds, and so forth.

Some fleet management systems provide historical information about vehicle routes. Such historical information can include start and stop information, vehicle locations at given times, and speed information, or the like. A fleet management system typically outputs this historical information in the form of a list. For example, a fleet management system might provide a map display that includes symbols representing vehicles in a vehicle fleet, and user selection of a vehicle symbol can cause a popup window to display a vehicle history list.

SUMMARY

The systems and methods described herein can be implemented by a computer system including computer hardware. The computer system may include one or more physical computing devices, which may be geographically dispersed or co-located.

In certain embodiments, a method of enabling users to customize a vehicle management system includes, by a computer system comprising computer hardware: outputting a custom report creation user interface for presentation to a user, where the custom report creation user interface includes one or more user interface controls that can enable a user to create a custom report. The method may also include downloading, from a vehicle management system, a data set related to a vehicle fleet to a user computer, as well as receiving a user selection of fields in the data set for inclusion in a custom report template. The method may further include receiving user layout details with respect to the selected fields, where the user layout details can include information for organizing a layout of the selected fields in the custom report template. Moreover, the method can include uploading the custom report template including the selected fields of the data set and the user layout details to the vehicle management system, thereby enabling the custom report template to be used by the vehicle management system to run a custom report.

The method of the previous paragraph can also, in some embodiments, be used in combination with any subset of the following features: where the data set comprises information regarding vehicle parameters; where the vehicle parameters comprise diagnostic trouble codes obtained from engine computers of a plurality of vehicles in the vehicle fleet; where the data set includes information regarding workflow in the vehicle fleet; where the information regarding workflow comprises information related to vehicle routes and driver performance with respect to servicing the vehicle routes; further including outputting a custom terminology user interface that provides functionality for a user to replace a fleet management term used in the vehicle management system with a custom term; further including outputting a custom alert user interface that can provide functionality for the user to define a custom alert based on vehicle parameters obtained from telematics data; and where the custom alert user interface further includes functionality for users to define the custom alerts to include conditional logic on multiple of the vehicle parameters.

In certain embodiments, a system for enabling users to customize a vehicle management system can include a customization module having physical computer hardware. The customization module can output a custom report creation user interface for presentation to a user, where the custom report creation user interface includes one or more user interface controls that can enable a user to create a custom report. The customization module can also download, from a vehicle management system, a data set related to a vehicle fleet to a user computer. The customization module can also receive a user selection of fields in the data set for inclusion in a custom report template. Further, the customization module can also receive user layout details with respect to the selected fields, where the user layout details include information for organizing a layout of the selected fields in the custom report template. Moreover, the customization module can also upload the custom report template comprising the selected fields of the data set and the user layout details to the vehicle management system, thereby enabling the custom report template to be used by the vehicle management system to run a custom report.

The system of the previous paragraph can also, in some embodiments, be used in combination with any subset of the following features: where the data set comprises information regarding vehicle parameters; where the vehicle parameters comprise diagnostic trouble codes obtained from engine computers of a plurality of vehicles in the vehicle fleet; where the data set includes information regarding workflow in the vehicle fleet; where the information regarding workflow comprises information related to vehicle routes and driver performance with respect to servicing the vehicle routes; further including a custom terminology module that can output a custom terminology user interface that provides functionality for a user to replace a fleet management term used in the vehicle management system with a custom term; further including a custom alert module that can output a custom alert user interface that can provide functionality for the user to define a custom alert based on vehicle parameters obtained from telematics data; and where the custom alert user interface further includes functionality for users to define the custom alerts to include conditional logic on multiple of the vehicle parameters.

In various embodiments, non-transitory physical computer storage can include instructions stored thereon for implementing, in one or more processors, a method of enabling users to customize a vehicle management system. The method of the previous paragraph can also, in some embodiments, be used in combination with any subset of the following features: where the data set comprises information regarding vehicle parameters; where the vehicle parameters comprise diagnostic trouble codes obtained from engine computers of a plurality of vehicles in the vehicle fleet; where the data set includes information regarding workflow in the vehicle fleet; where the information regarding workflow comprises information related to vehicle routes and driver performance with respect to servicing the vehicle routes; further including outputting a custom terminology user interface that provides functionality for a user to replace a fleet management term used in the vehicle management system with a custom term; further including outputting a custom alert user interface that can provide functionality for the user to define a custom alert based on vehicle parameters obtained from telematics data; and where the custom alert user interface further includes functionality for users to define the custom alerts to include conditional logic on multiple of the vehicle parameters.

The method of the previous paragraph can also, in some embodiments, be used in combination with any subset of the following features: where the data set comprises information regarding vehicle parameters; where the vehicle parameters comprise diagnostic trouble codes obtained from engine computers of a plurality of vehicles in the vehicle fleet; where the data set includes information regarding workflow in the vehicle fleet; where the information regarding workflow comprises information related to vehicle routes and driver performance with respect to servicing the vehicle routes; further including outputting a custom terminology user interface that provides functionality for a user to replace a fleet management term used in the vehicle management system with a custom term; further including outputting a custom alert user interface that can provide functionality for the user to define a custom alert based on vehicle parameters obtained from telematics data; and where the custom alert user interface further includes functionality for users to define the custom alerts to include conditional logic on multiple of the vehicle parameters.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 12 and 13 illustrate example custom terminology user interfaces.

Figure 14:
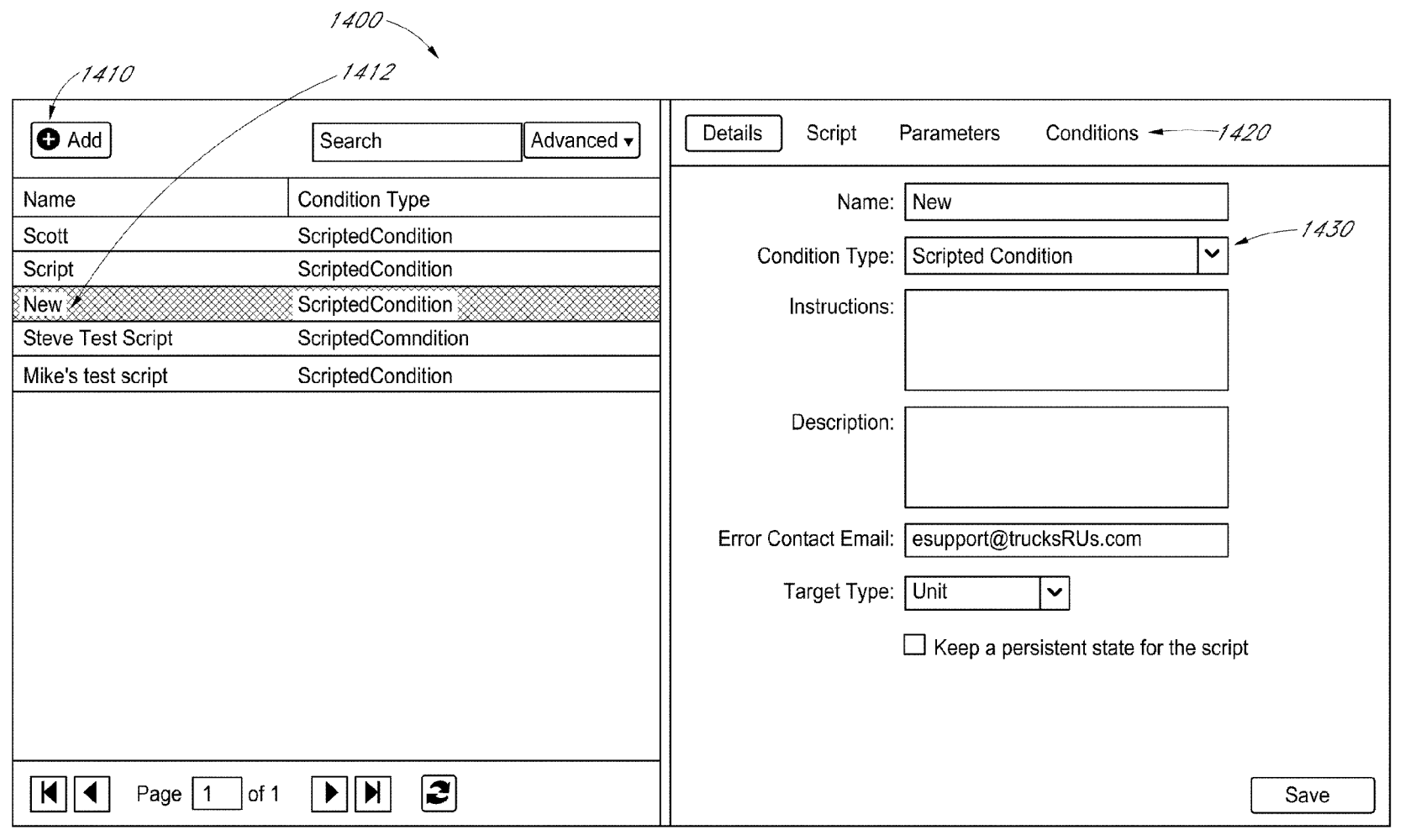

FIGS. 14 through 19 illustrate example custom alert creation user interfaces.

DETAILED DESCRIPTION

I. Introduction

This disclosure describes customization features for providing users with the ability to customize various aspects of a vehicle management system. In certain embodiments, these customization features can include functionality for generating custom reports based on vehicle parameters, including diagnostic codes. The customization features can also include features for customizing alerts based on vehicle parameters and features for customizing nomenclature in the vehicle management system.

The features described herein may also be implemented for non-fleet vehicles, such as for personal vehicles having in-vehicle navigation systems. In addition, the features described herein may also be implemented for assets generally, such as vehicles, heavy equipment, trailers, site equipment, and so forth. However, for ease of illustration, the remainder of this disclosure will describe vehicle management systems in the context of vehicle fleets, such as fleets of service vehicles, trucks, taxis, planes, boats, snow mobiles, emergency vehicles, other vehicles, and the like.

II. Vehicle Management System

Figure 1:
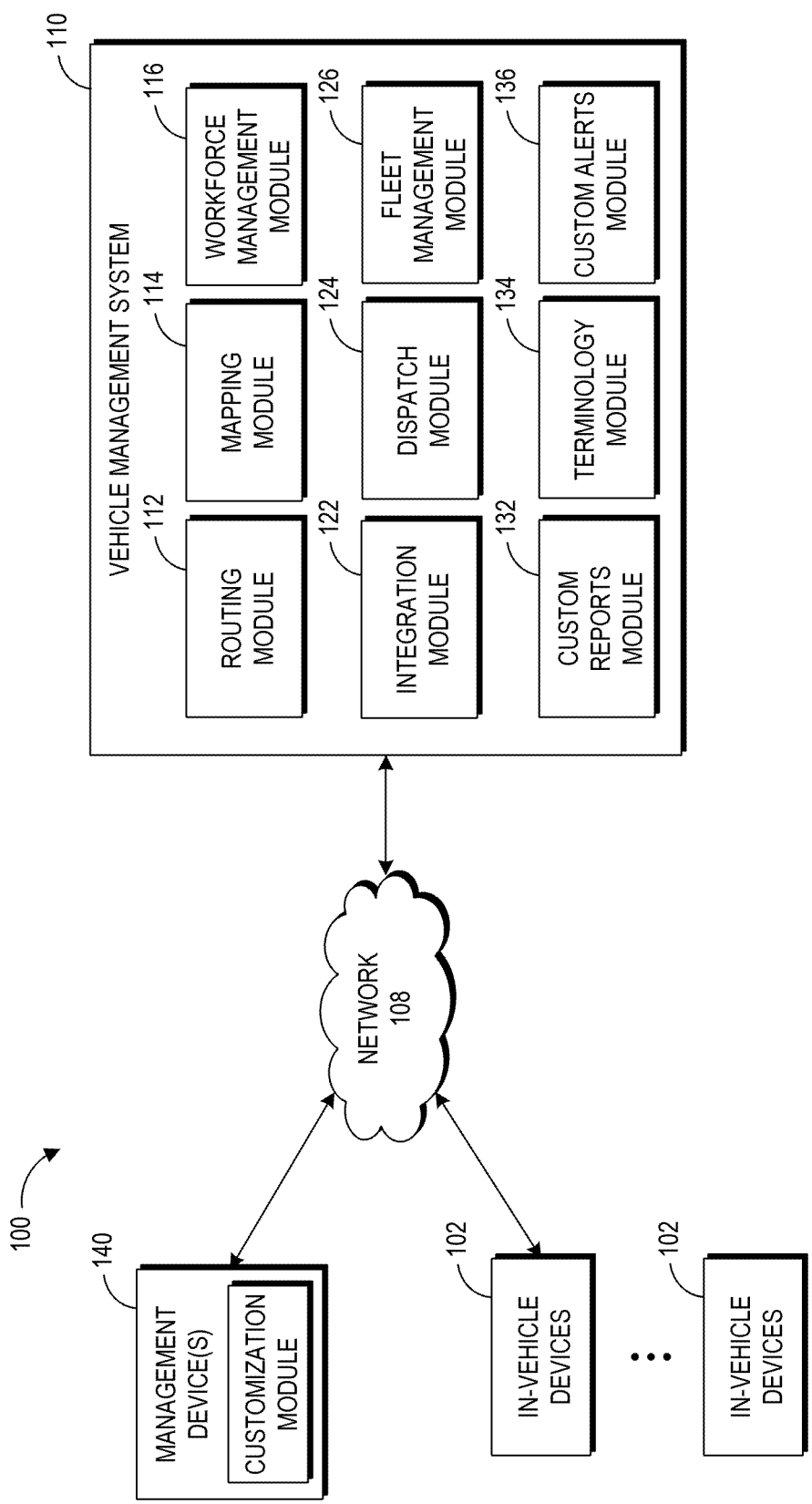
FIG. 1 illustrates an embodiment of a vehicle management system that can implement various customization features for managing a fleet of vehicles.

FIG. 1 illustrates an embodiment of a computing environment 100 for implementing a vehicle management system 110. Among other features, the example vehicle management system 110 shown can generate a vehicle management user interface that includes vehicle history timelines.

In the computing environment 100, one or more in-vehicle devices 102 and management devices 140 communicate with the vehicle management system 110 over a network 108. The in-vehicle devices 102 can include computing devices installed in fleet vehicles. These devices 102 can include navigation functionality, routing functionality, and the like. The in-vehicle devices 102 can receive route information and other information from the vehicle management system 110. In addition, the in-vehicle devices 102 can report information to the vehicle management system 110, such as driver location, vehicle sensor data, vehicle status (e.g., maintenance, tire pressure, or the like), and so forth.

The illustrated network 108 may be a LAN, a WAN, the Internet, combinations of the same, or the like. For ease of illustration, the vehicle management system 110 has been depicted as a centralized system or platform. However, in other implementations, at least some of the functionality of the vehicle management system 110 is implemented in other devices or in multiple servers or data centers. For example, the vehicle management system 110 can be implemented as software as a service (SaaS) in the cloud and may be located in multiple data centers around the world (or portion thereof). Other possible implementations of the vehicle management system 110 can include many more or fewer components than those shown in FIG. 1.

The management devices 140 can be computing devices used by dispatchers, fleet managers, administrators, or other users to manage different aspects of the vehicle management system 110. For example, a user of a management device 140 can access the vehicle management system 110 to generate routes, dispatch vehicles and drivers, and perform other individual vehicle or fleet management functions. With the management devices 140, users can access and monitor vehicle information obtained from one or more of the in-vehicle devices 102 by the vehicle management system 110. Such vehicle status information can include data on vehicle routes used, stops, speed, vehicle feature usage (such as power take-off device usage), driver behavior and performance, vehicle emissions, vehicle maintenance, energy usage, and the like. In some embodiments, the management devices 140 are in fixed locations, such as at a dispatch center. The management devices 140 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network 108. In the depicted embodiment, the vehicle management system 110 includes a fleet management module 126, a mapping module 114, a telematics module (not shown), a routing module 112, a dispatch module 124, and an integration module 122. These components can, but need not, be integrated together on a common software or hardware platform.

The fleet management module 126 can include functionality for generating, rendering, or otherwise displaying one or more vehicle management user interfaces. The vehicle management user interfaces can include a map or list of vehicles that depicts symbols or other data representative of vehicles. In addition, the vehicle management user interfaces can advantageously include a history timeline display. For example, in response to user selection of one or more of the vehicle symbols from the map or list, the vehicle management user interface can output one or more vehicle history timelines corresponding to the selected vehicle or vehicles. Although the fleet management module 126 generates the user interface, in certain embodiments the fleet management module 126 outputs the user interface to the management devices 140, which actually display the user interface and associated history timeline display 116. Thus, as used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 126 can communicate with the mapping module 114 to obtain mapping data, which the fleet management module 126 can include in the vehicle management user interface. The mapping data can be compressed, transmitted, re-rendered, and displayed on the management user interface. Other data can also be overlaid to enhance the map and management layout. The mapping module 114 can be a geographic information system (GIS) in one embodiment. The fleet management module 126 can also access a telematics module (not shown) to obtain vehicle status data for inclusion in vehicle history displays. The telematics module can provide this vehicle status data based on telematics data obtained from the in-vehicle devices 102.

The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 112 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 110 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 122 can facilitate integration of the vehicle management system 110 with other systems, such as fuel card systems, payroll systems, supply chain system, insurance systems, and the like. The dispatch module 124 can provide functionality for users of the management devices 140 to assign drivers and vehicles to routes selected by the routing module 110.

In the depicted embodiment, the vehicle management system 110 includes a custom reports module 132. The custom reports module 132 can allow users (such as users of the management devices 140) to create reports defined by the specific data elements most applicable to their fleet and work. As described above, the vehicle management system 110 can obtain a significant amount of telematics data from the in-vehicle devices 102. While much of this data is valuable to many if not all organizations that use the services of the vehicle management system 110, not all of this data may be relevant to every organization. The custom reports module 132 can allow users such as fleet administrators and managers to define the data elements they want to see from the telematics data and to organize this data in such a way that is most logical for their fleet operations. In certain embodiments, because the vehicle management system 110 is implemented in the cloud (e.g., as described below), the custom reports module 132 may be able to create custom reports in real time or near real time such as within a few seconds, moments, or minutes from a request for a custom report.

Thus, due to the large computing capacity that is used by the vehicle management system 110, in certain embodiments, the custom reports module 132 can allow for massive reports to be built in run and real time without delays or without substantial delays, for example, on data obtained from hundreds or even thousands of vehicles. A customization module 142 in the management device 140 can communicate with the custom reports module 132 over the network 108 to create these custom reports, as will be described in greater detail below with respect to FIGS. 7 through 11.

In the depicted embodiment, the vehicle management system 110 also includes terminology module 134. The terminology module 134 can allow users to change terms and wording throughout the vehicle management system 110 to match a company's internal nomenclature. Almost every organization has its own jargon and terminology. The terminology module 134 can allow a user, such as a user of the management device 140, to rename key terms to match internal terminology. For example, a user might redefine a term such as "driver" to be "field technician" or a term like "Van 1" to be "Regional Route 1" or the like.

Also shown in the vehicle management system 110 is a custom alerts module 136. The custom alerts module 136 can allow users (such as users of the management devices 140) to define alerts or alarms based on any and all parameters that exist in the vehicle management system 110. For instance, when a vehicle's windshield wipers are turned on, an alert can be sent to a fleet manager that it is currently raining at the vehicle's location. Very flexible alerts can be customized and built to combine multiple parameters in a single alert, and customizable actions and recommendations can be given based on the custom alerts. As an example, one alert may be defined to be created or triggered when a driver is speeding when it is raining. Thus, unlike in previous systems where a user might be alerted simply to speeding, the custom alerts module 136 can combine the fact that a user is speeding with another data input such as raining to determine whether to issue an alert or alarm. Further, when such an alert or alarm is issued, the custom alerts module 136 can automatically instruct the driver via a communication to the in-vehicle device 102 to reduce the driver's speed limit by a certain specified amount. This specified amount can be a parameter that is part of the custom alert as determined by a user of the management device 140. For example, a user of the management device 140 when setting up the alert can specify a parameter that the speed limit should be reduced when raining by ten miles per hour below the speed limit or the like. Thus, the custom alert module 136 can automatically provide this suggestion to reduce the speed limit by ten miles per hour or the like to the in-vehicle device 102 in response to the appropriate alert being triggered.

III. Example Customization Processes

Figure 2:
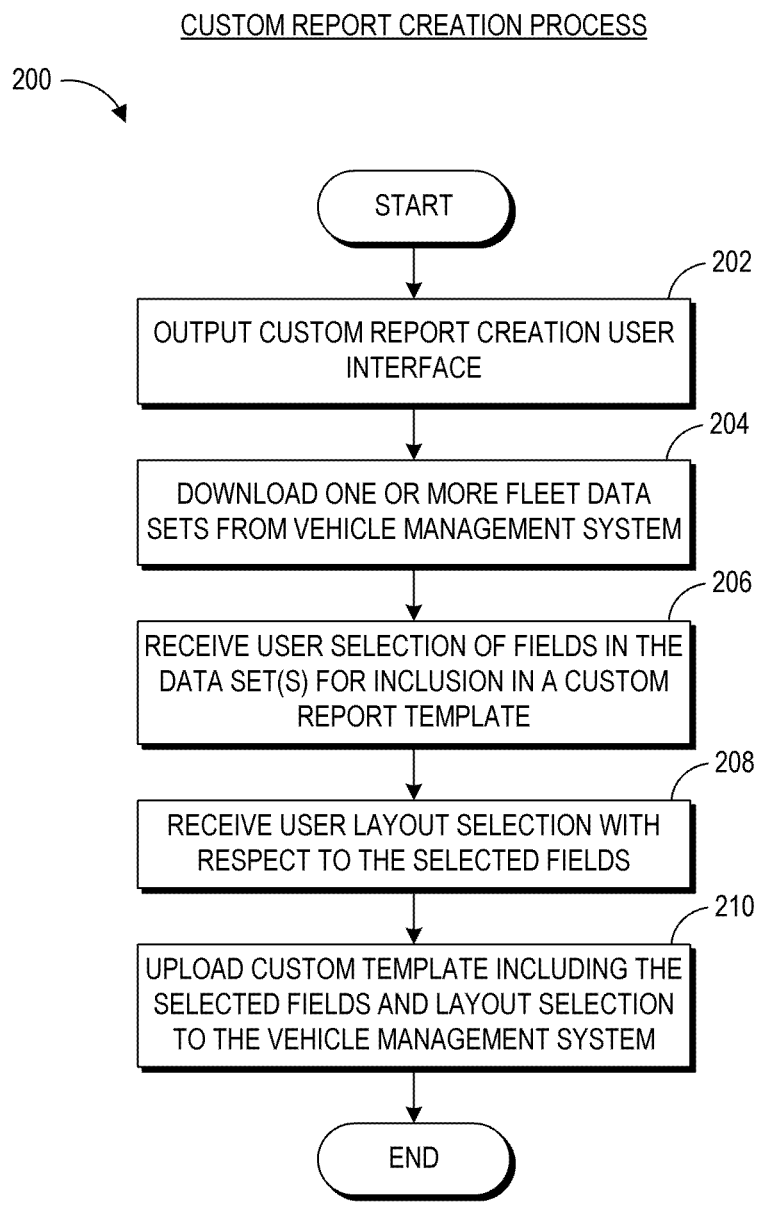
FIG. 2 illustrates an embodiment of a custom report creation process that can be implemented by the vehicle management system of FIG. 1.

Turning to FIG. 2, an embodiment of a custom report creation process 200 is shown. The custom report creation process 200 may be implemented by the vehicle management system 110 or by any other computing system comprising one or more machines. In one particular embodiment, the custom report creation process 200 can be implemented in part by the custom reports module 132 and/or customization module 142 of FIG. 1. Advantageously, in certain embodiments, the custom report creation process 200 enables a user such as a fleet manager to create a custom report on any one or more parameters collected by the vehicle management system 110.

At block 202, the custom reports module 132 outputs a custom report creation user interface. An example of this user interface is described below (see, e.g., FIG. 7). In general, the custom report creation user interface can include one or more user interface controls that enable a user to initiate the creation of a new custom report from an existing template or from a new template. The customization module 142 can also implement block 202 in some embodiments by outputting a custom report user interface on the management device 140.

At block 204, the customization module 142 of the management device 140 downloads one or more fleet data sets from the vehicle management system to the management device. When custom report creation is initiated, the custom reports module 132 can make available one or more data sets to the customization module 142 that include data, for example, about drivers, or about vehicles, or about points of interest in a region serviced by a fleet, among other examples. Downloading the one or more fleet data sets can enable the customization module 142 and the user thereof to examine fields in the data that the user may wish to build a report on.

The customization module 142 can output a user interface that enables a user to select these fields. An example of such a user interface is described in greater detail below with respect to FIG. 9.

At block 206, the customization module 142 receives a user selection of fields in the data set or data sets for inclusion in a custom report template. The custom report template can be used to create multiple custom reports. At block 208 the customization module 142 receives a user layout selection with respect to the selected fields. The layout selection can govern the way that the fields and their values are depicted on a display and can include functional placement elements as well as aesthetic placement elements.

At block 210, the customization module 142 uploads the custom template including the selected fields and layout selection to the vehicle management system 110. A report can then be run using the custom template by a user of the vehicle management system 110. An example process for creating such a report is described below with respect to FIG. 3.

Figure 3:
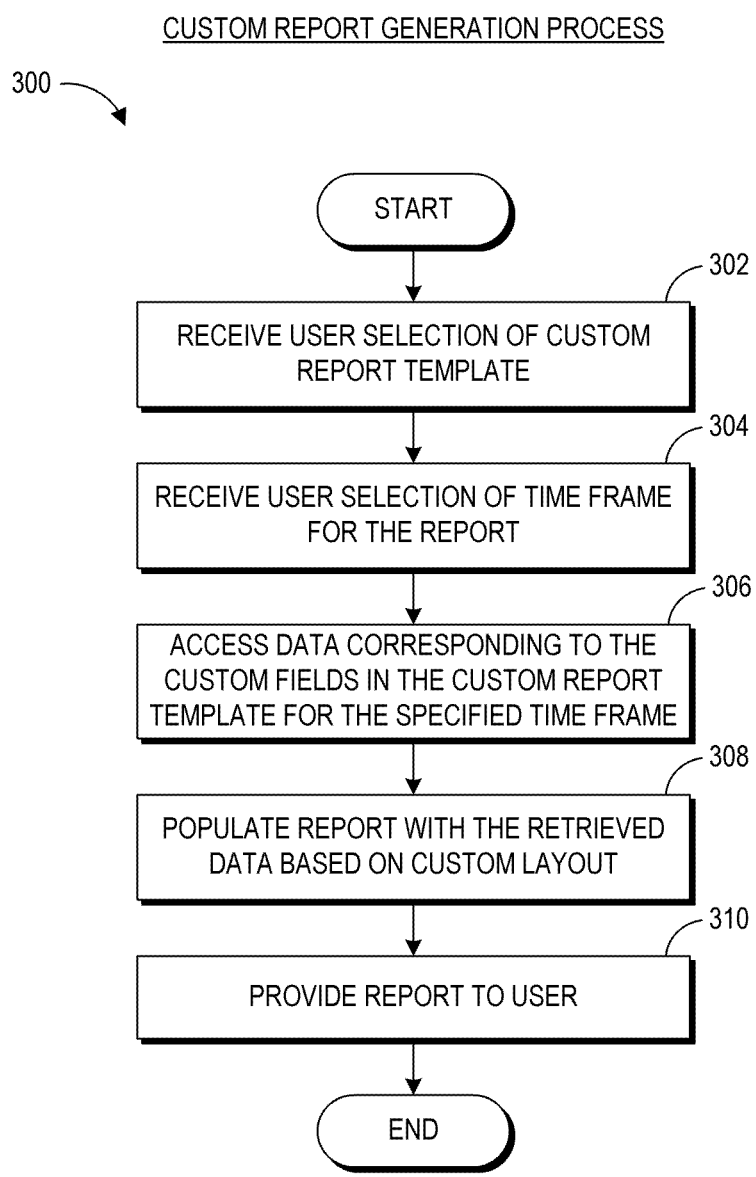
FIG. 3 illustrates an embodiment of a custom report generation process that can be implemented by the vehicle management system of FIG. 1.

In FIG. 3, an example custom report generation process 300 is shown. Like the process 200 of FIG. 2, the custom report generation process 300 can be implemented by the vehicle management system 110. In one embodiment, for example, the process 300 is implemented by the custom reports module 132. However, the process 300 can be implemented by any computing device or the like.

At block 302 of the process 300, the custom reports module 132 receives a user selection of a custom report template. The custom report template may have been created using the features of the process 200 described above with respect to FIG. 2. The custom reports module 132 may, for instance, provide a user interface that outputs a menu of custom templates from which a user may select. These templates may be arranged categorically, hierarchically, alphabetically, or the like.

At block 304, the custom reports module 132 can receive a user selection of a timeframe for the report. The timeframe can specify a timeframe for which data has been gathered and which will be reported on in the report such as the past day, the past hour, the past week, the past month, the past year and so forth. There may be some reports for which providing a timeframe may be optional or not used at all. For example, a report may be constructed to report all VIN numbers of all vehicles in the fleet and may or may not specify a timeframe with such a report.

At block 306, the custom reports module 132 accesses data corresponding to the custom fields in the custom report template for the specified timeframe. The vehicle management system 110 may include one or more databases or data stores (not shown), which can store the custom fields as well as the data in those fields and can retrieve the data in response to a request from the custom reports module 132. The custom reports module 132 can then populate a report with the retrieved data based on the custom layout of the template at block 308. And at block 310, the custom reports modules 132 can provide this report to the user. Providing the report to the user can include, for example, outputting the report on a user interface, such as providing the report over the network 108 to the management device 140. The customization module 142 can then output the report, for example, in a browser, in a PDF document, a Microsoft™ Word document, or other type of document or application program. Providing the report to the user can also include instead of directly displaying the report providing an electronic communication that includes the report such as an electronic mail or e-mail or providing a link to the report to the user in an electronic message, combinations of the same or the like.

Figure 4:
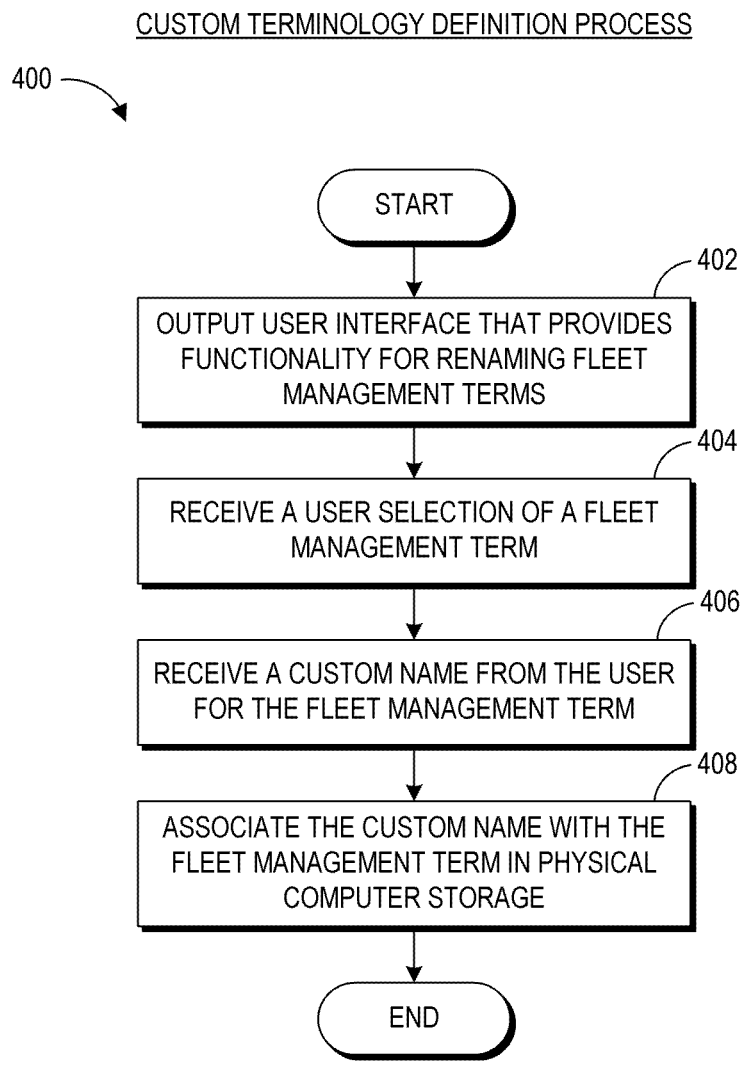
FIG. 4 illustrates an embodiment of a custom terminology definition process that can be implemented by the vehicle management system of FIG. 1.

Turning to FIG. 4, an example embodiment of a custom terminology definition process 400 is shown. The process 400 can also be implemented by the vehicle management system 110. For example, the terminology module 134 of the vehicle management system 110 can implement the process 400. The custom terminology definition process 400 may also be implemented by any computing device and can provide functionality for renaming nomenclature in the vehicle management system 110 to suit company's needs and goals. In an embodiment, the custom terminology definition process 400 can enable renaming of nomenclature in various aspects of the vehicle management system 110 including, e.g., user interfaces, a database, and in other data, as well as in information depicted in the in-vehicle devices 102.

At block 402, the terminology module 134 outputs a user interface that provides functionality for renaming fleet management terms. The user interface can be accessed by the management device 140 over the network 108. The user interface may include user interface controls that enable a user to select a fleet management term and provide a replacement for the term. Thus, continuing with the process 400 at block 404 the terminology module 134 receives a user selection of a fleet management term such as "driver" or "van" or the like.

At block 406, the terminology module 134 receives a custom name from the user for the fleet management term which can be used to replace the fleet management term in some or all instances where that fleet management term is included in the vehicle management system 110. At block 408, the terminology module 134 associates the custom name with the fleet management term and physical computer storage. In some embodiments, this block 408 can include searching and replacing the original term with the new term in a database of the vehicle management system 110.

Figure 5:
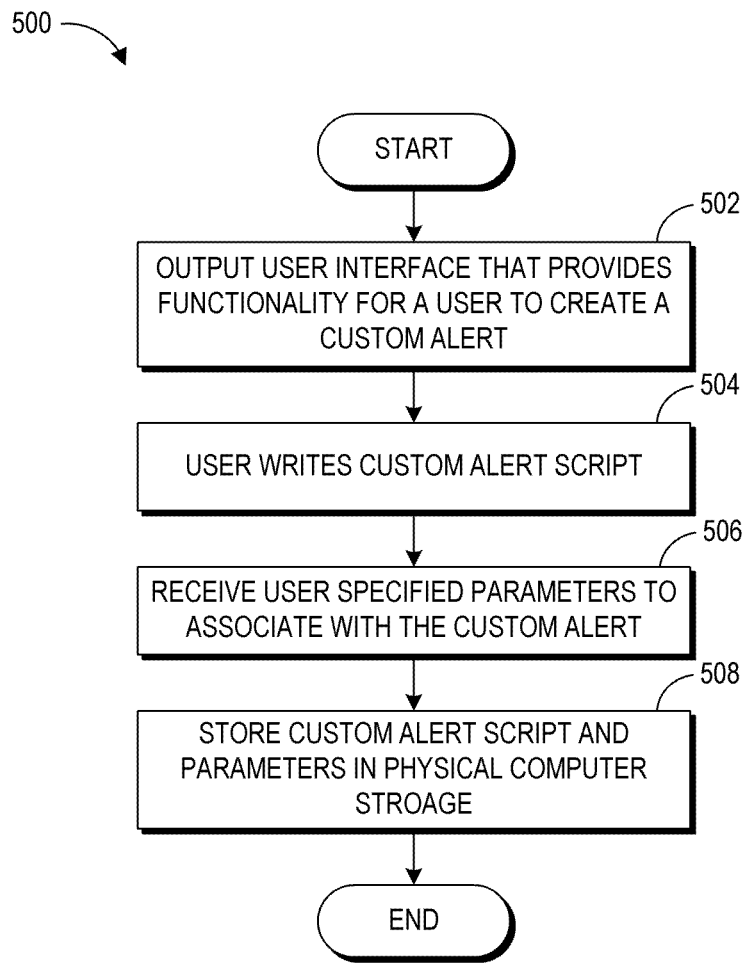
FIG. 5 illustrates an embodiment of a custom alert creation process that can be implemented by the vehicle management system of FIG. 1.

Turning to FIG. 5, an embodiment of a custom alert creation process 500 is shown. The custom alert creation process 500 may be implemented by the vehicle management system 110. In particular, in an embodiment the process 500 is implemented by the custom alerts module 136. The process 500 may also be implemented by any computing device. In an embodiment, the custom alert creation process 500 facilitates creating alert templates that can later be invoked or instantiated to assign alerts that can be used to detect conditions in a vehicle fleet that are noteworthy and/or that deserve further attention from a fleet administrator or other user.

At block 502, the custom alerts module 136 outputs a user interface that provides functionality for a user to create a custom alert. The user interface may include any of a variety of user interface controls that enable a user to select parameters that the user wishes to use as custom criteria for generating alerts. As a simple example, in one instance the user interface can enable a user to create an alert that triggers when a user is speeding for a certain period of time and can provide the alert to a fleet administrator, for example, on a display of the management device 140. However, advantageously in certain embodiments the custom alert creation process can provide more flexible and complex alerts and alert creation capability. For example, the custom alerts module 136 can provide for combining parameters using conditionals, boolean logic or the like to come up with alerts that are highly customized to a user's business. As one example, a user may wish to determine whether a vehicle is moving and a seatbelt is unbuckled. A user can specify that these parameters should be monitored by the custom alerts module 136. The custom alerts module 136 can obtain the telematics data obtained by the vehicle management system 110 corresponding to sensor data in the vehicle that indicates whether the vehicle is moving and the seatbelt is unbuckled, and if both conditions are met, can trigger an alert or alarm.

As another example, a user may be able to specify that when a particular diagnostic trouble code (DTC) obtained from the engine computer (e.g., via an OBDII or CAN interface) is firing and a vehicle leaves a headquarters then an alert can be sent to tell the driver to return to the headquarters. For example, if the DTC code is a code that could reflect a serious problem to the vehicle, and it is known that the vehicle is moving, it can be useful to alert the driver and/or fleet manager to the problem.

In another embodiment, the user interface includes functionality for users to write scripts that can implement the conditionals, boolean logic or other logic as described above. Thus, for example, at block 504 a user may write a custom alerts script using an application programming interface (API) provided by the custom alerts module 136. Alternatively, the provider of the vehicle management system 110 can write the custom alerts script and provide custom alerts scripts to users for execution and/or customization. Example custom alerts scripts are described in greater detail below.

At block 506, the custom alerts module 136 receives a user specified parameter or parameters to associate with the custom alert. These parameters can involve some action or value associated with an action to be taken when an alert fires. For example, referring to the example above where a diagnostic trouble code is firing and a vehicle has just left the headquarters, a parameter that specifies an action to be taken upon this alert can be to issue an electronic message to the driver via, for example, the in-vehicle device 102 that requests the driver to return to headquarters as soon as possible. Referring to the rain example described above, where an alert can be generated if a user is speeding in the rain, an example of a parameter that could be provided as an output associated with the alert is to inform the driver via the in-vehicle device 102 the driver should reduce his speed by a certain amount (such as ten miles per hour).

At block 508, the custom alerts module 136 stores the custom alerts script and parameters in physical computer storage. The parameters may be optional in one embodiment and a default action may be taken if an alert is provided. The custom alerts script can be like a template, as described above, stored in the physical computer storage and may be available to be run and optionally further customized at a later stage.

Figure 6:
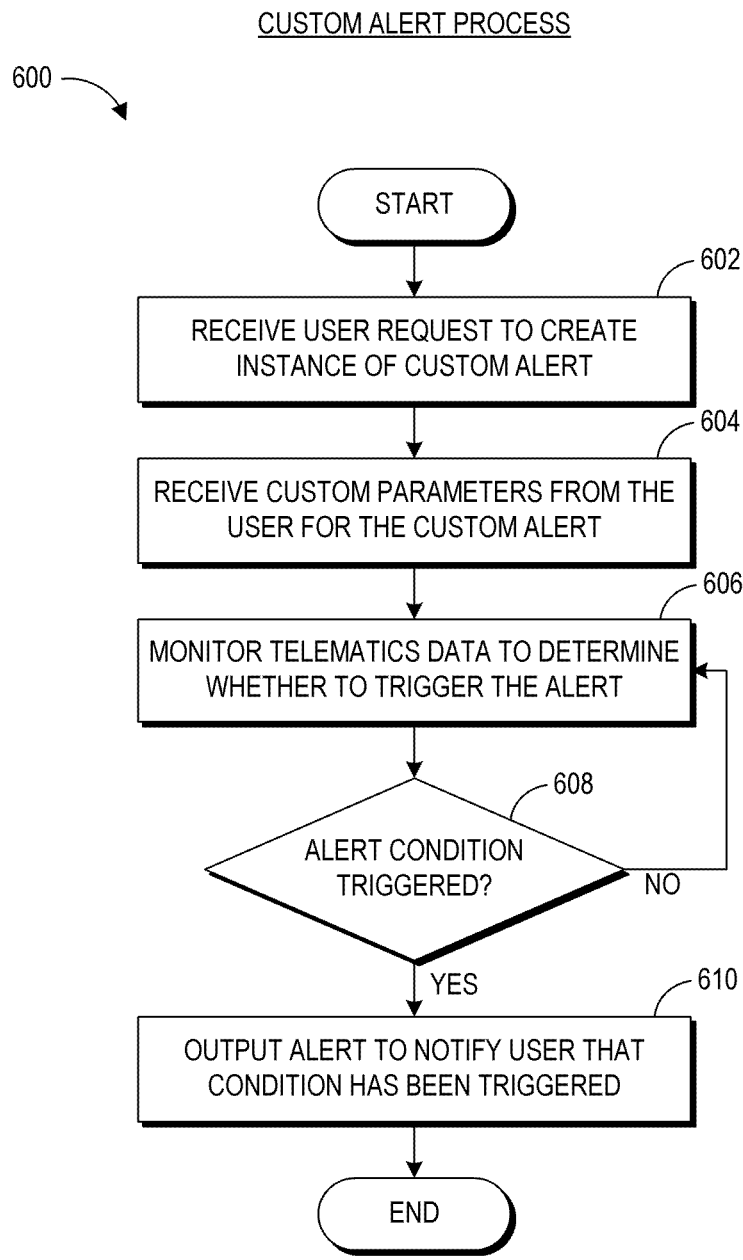
FIG. 6 illustrates an embodiment of a custom alert process that can be implemented by the vehicle management system of FIG. 1.

Turning to FIG. 6, an example custom alert process 600 is shown that can also be implemented by the custom alerts module 136 or any other computing device. At block 602, the custom alerts module 136 receives a user request to create an instance of a custom alert that was previously created, for example, using the process 500 of FIG. 5 described above. The custom alert to be instantiated may be stored as a template in physical computer storage such as a database or the like.

At block 604, the custom alerts module 136 receives custom parameters from the user for the custom alert. These custom parameters can include values for the actions specified in the parameter template of the custom alert as described above. At block 606, the vehicle management system 110 can monitor telematics data to determine whether a condition exists in the telematics data (such as speeding in the rain) that triggers the alert. For example, the vehicle management system 110 can gather the data and the custom alerts module 136 can examine some or all of the data to determine whether an alert should be triggered. If a condition of the alert has triggered or has occurred as determined in decision block 608, then the custom alerts module 136 outputs an alert to notify the user that the condition has been triggered. The condition of the alert can be triggered by a vehicle parameter or other parameter going outside of a range specified by the alert, by a threshold being met or exceeded, or the like. This alert output can include instructions related to the parameters described above, such as to slow down, return to the headquarters, or the like. If the alert condition is not triggered at block 608, the process 600 loops back to block 606 and continues to monitor the data until an alert condition is detected.

IV. Example User Interfaces

FIGS. 7 through 19 illustrate a variety of example user interfaces that can be generated by the vehicle management system 110 and provided, for example, as display screens on the management devices 140 and/or the vehicle devices 102. These user interfaces can be generated as web pages to be displayed in web browser software installed on the management devices 140 and/or the in-vehicle devices 102. Alternatively, the user interfaces shown may be generated and displayed in other application software. Further, any of the user interface controls described herein can be interchangeable with other user interface controls. A button, for instance, could be replaced with a checkbox or a link in another implementation.

Figure 11:
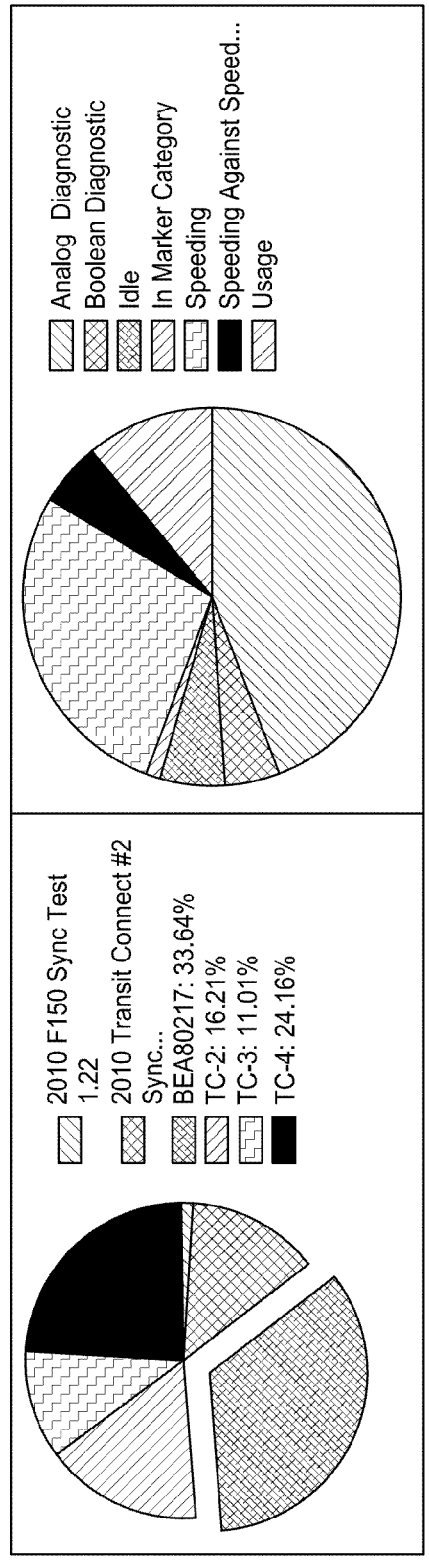
FIG. 11 depicts an example custom report.

Referring specifically to FIGS. 7 through 11, these user interfaces 700 through 1100 may be implemented by the custom reports module 132 and/or customization module 142 as will be described in greater detail below. The user interfaces 700 through 1000 represent example custom report creation user interfaces, and the user interface 1100 of FIG. 11 depicts an example custom report.

Figure 7:
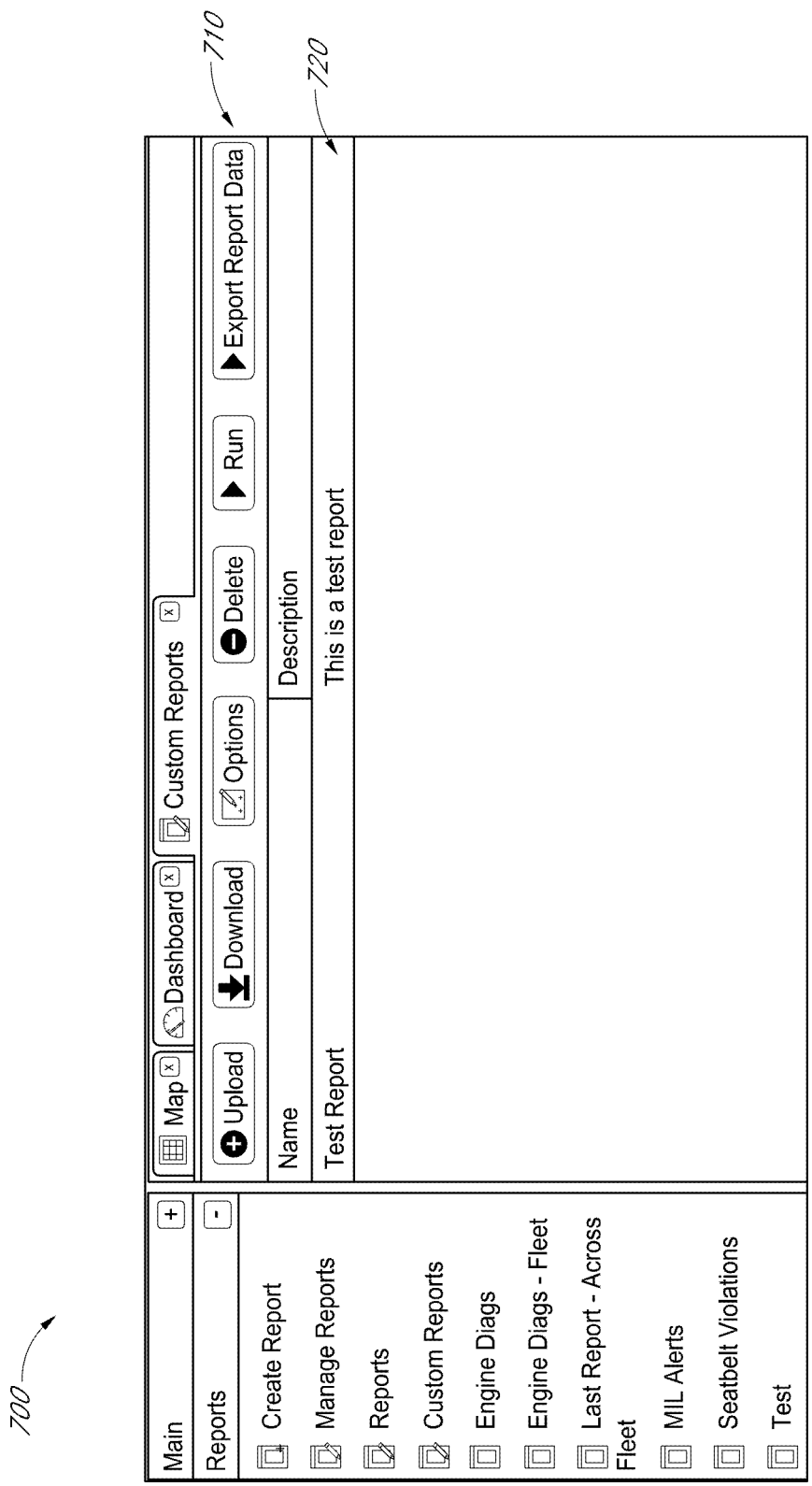
FIGS. 7 through 10 illustrate example custom report creation user interfaces.

Turning to FIG. 7, in the user interface 700 a menu bar 710 of controls is shown that enables a user to start creating a custom report. These controls 710 include an upload button that allows a user to upload a custom template, create it on the user's management device 140 or directly by the custom reports module 132. The controls in the menu bar 710 further include a download button that can be selected by a user to download a data set to the user's computer to start creating a custom report. Options, delete button and a run button as well as an export report data button are also included in the controls of the menu bar 710. An example report 720 is also listed and could be selected by a user to run the report using the run button in the menu bar 710.

Figure 8:
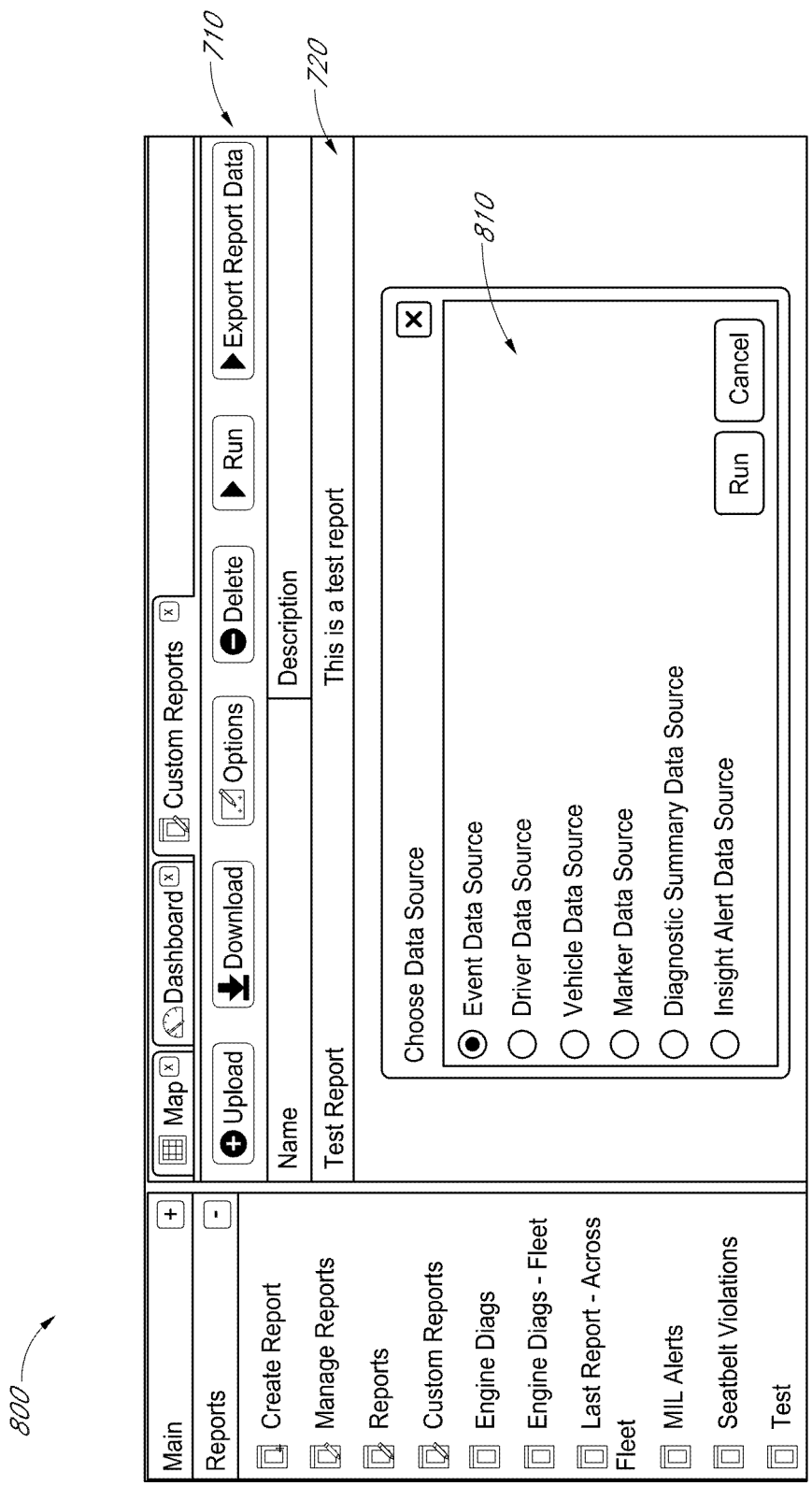

If the user were to select the download button in the menu bar 710, the user would be presented with the user interface 800 of FIG. 8 or the like. The user interface 800 includes a pop-up window 810 that depicts various data sources or data sets that may be chosen by a user. A user can choose one or more data sets to download to the user computer. These data sets, as described above, can include data from any period of time that has been collected including telematics data, driver behavior data, vehicle data and so forth, vehicle event data, diagnostic data, and also alert data. Downloading such data can enable a user to select fields in the data to add to a custom report.

Figure 9:
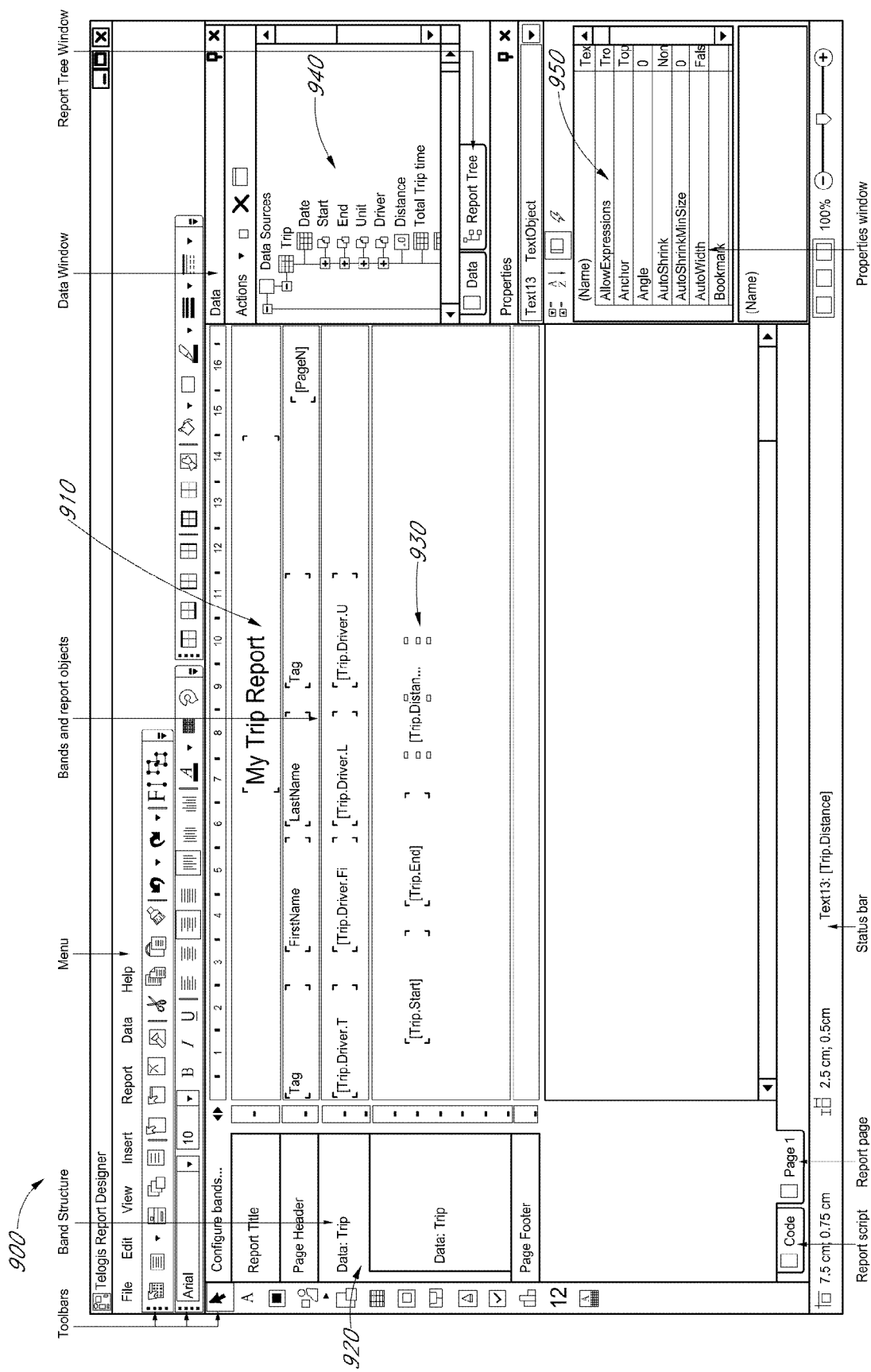
Figure 10:
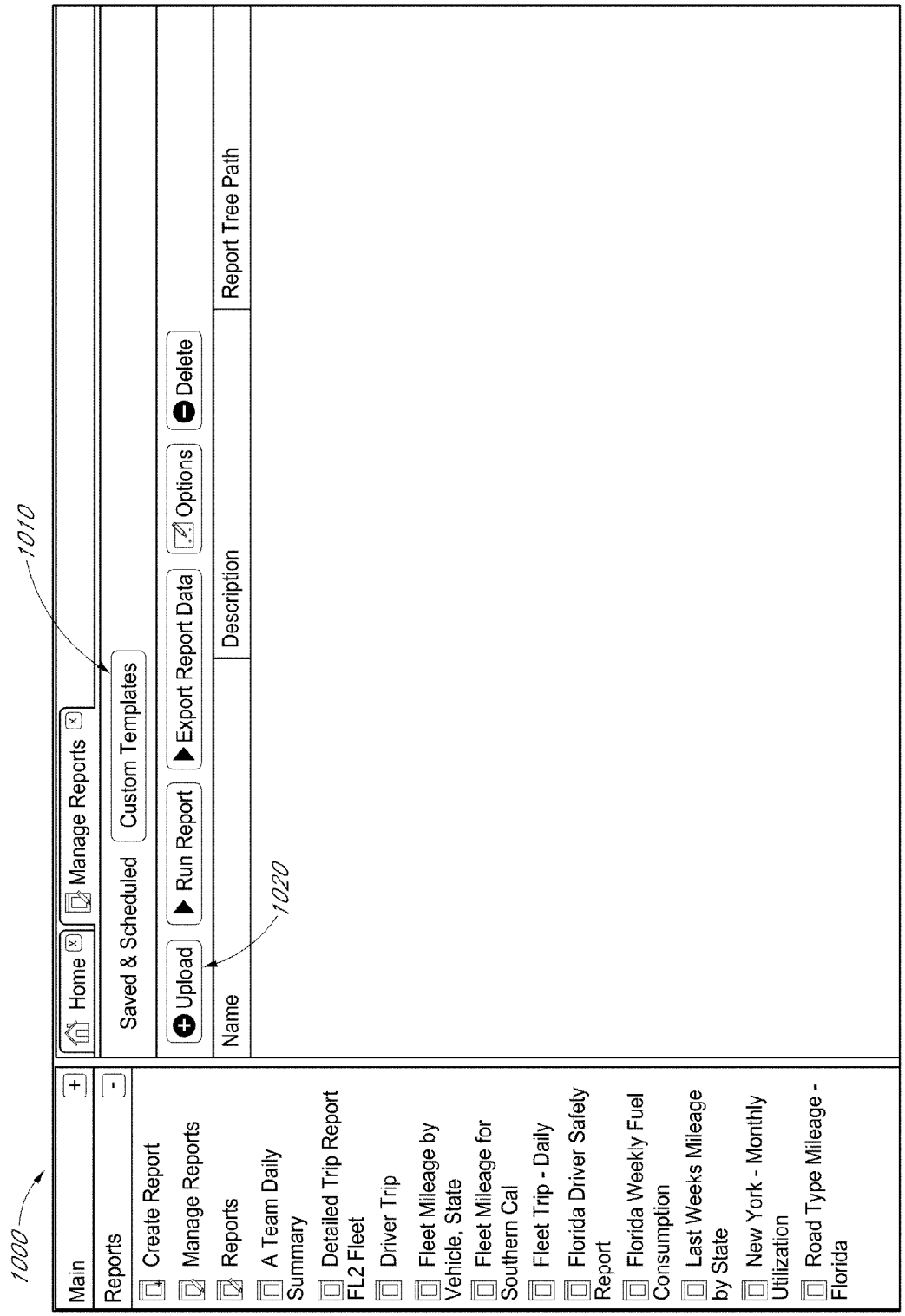

Turning to FIG. 9, the user interface 900 is an example report creation user interface that can be output by the customization module 142. The user interface 900 includes a report layout area 910 that allows a user to lay out various data elements 930 for a custom report. These data elements can be organized according to bands or rows, and a band user interface control 920 can allow a user to define the bands, adjust their height, width and so forth. The data elements 930 are shown in the frame 910 and can be selected from a set of fields in a downloaded data set in a data window 940. These data sets can be mined by the customization module 142 from the data downloaded with respect to FIG. 8. For example, the data sets in the pane 940 can include fields obtained from the telematics data in the downloaded data set, and a user can drag and drop these fields onto the report to cause the report to populate these fields with relevant data when the report is run.

A user can adjust the properties of the parameters 930 using a properties window 950. Each parameter can include one or more properties that can allow the user to specify both values, operations and the like to be associated with those parameters 930 as well as visual layout and aesthetic properties to be applied to those parameters. Once a user has created the custom report template using the user interface 900, the user can upload the template to the custom reports module 132 using the user interface shown in FIG. 10. The user interface 1000 includes a custom templates tab 1010 including an upload control 1020 that allows a user to upload the custom report and subsequently execute that report. An example of such a report 1100 is shown in FIG. 11. The example report 1100 shown includes graphics and data formatted in rows and columns. Other example report formats can include comma-delimited reports (e.g., .csv files), text files, HTML files, and the like.

Figure 12:
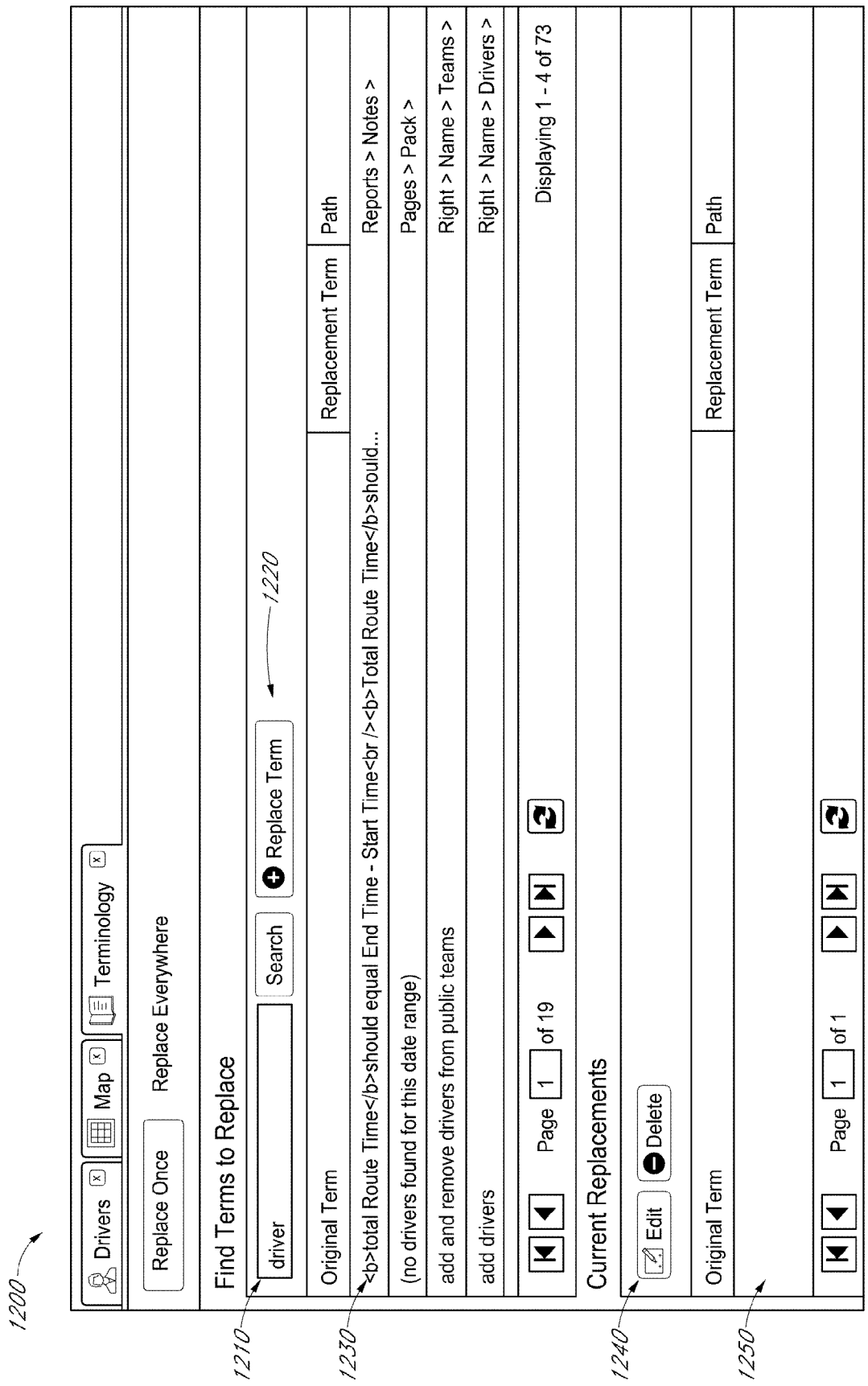

FIGS. 12 and 13 illustrate example custom terminology user interfaces 1200 and 1300. In the example custom terminology user interface 1200, a user can input a term into a textbox 1210 and search for the term and replace the term using controls 1220. As described above, the terminology module 134 can enable a user to search or replace terms used by the vehicle management system 110 in user interfaces, documentation and in data bases among other areas. While the terminology module 134 may provide functionality for a user to replace a term in some areas of the vehicle management system 110 while leaving that term in others, in the depicted embodiment, the user interfaces 1200 and 1300 replace a term throughout the vehicle management system 110.

A textbox pane 1230 in FIG. 12 shows some uses of the original term in the vehicle management system 110. In this example, the term is "driver." A current replacements pane 1250 is also shown, which can include a list of replaced words and their previous terms. This pane 1250 is empty in the example embodiment, but once a replacement term is created using the control 1220, such terms can be displayed in the pane 1250 and can subsequently be edited or deleted using controls 1240. If the user were to select the replaced term button 1220, the user could be presented with a pop-up window 1300 as shown in FIG. 13 that allows a user to type in a replacement term in a textbox 1310 and save the replacement term using the save control 1320.

FIGS. 14 through 19 illustrate example custom alert creation user interfaces 1400 through 1900. Each of these user interfaces 1400 through 1900 can be implemented by the custom alerts module 136 described above. In the user interface 1400 of FIG. 14, a user can create a new alert by clicking an add control 1410. Example alerts 1412 are shown. Different menu options 1420 for customizing an alert include a details control, script control, parameters control and conditions control. The details control is selected in the menu 1420 providing various user interface controls 1430 for customizing aspects of the alert such as a textbox to name the alert, a condition type, instructions that could be output to a user when the alert is fired or created, a description of the alert, an error contact e-mail to e-mail the alert to and a target type. The target type selected in the example shown is a unit, which can correspond to a vehicle or other asset. Other types of target types can include drivers or the like.

Figure 15:
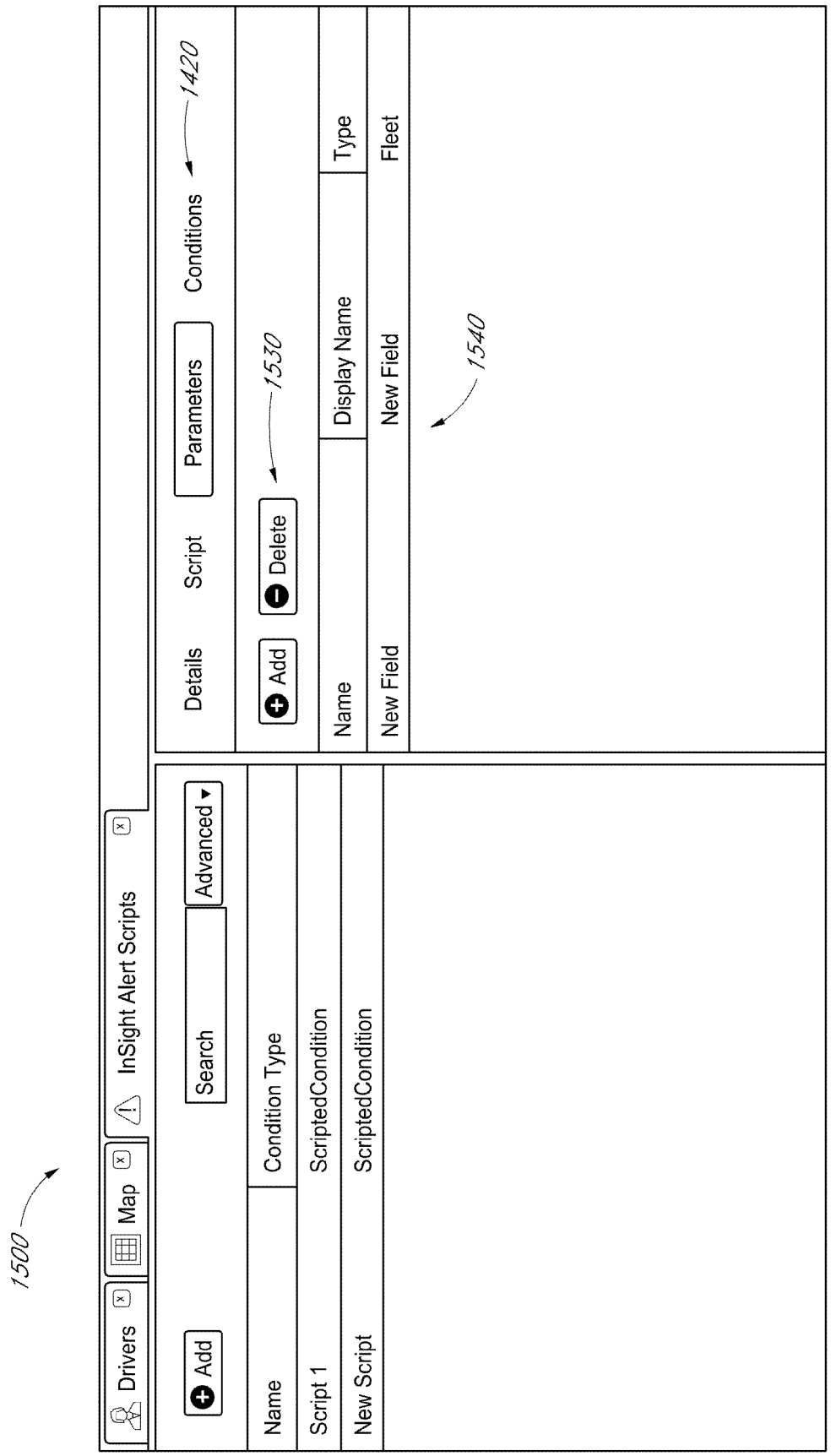

FIG. 15 includes an example user interface 1500 that includes the parameters control selected from the menu 1420 which provides add and delete buttons 1530 for adding parameters to an alert. As described above, parameters can be used by an alert to request some action (e.g., from a driver or other user) when an alert is triggered. An example parameter 1540 is shown that includes a name, a display name and a type. The parameter 1540 could be selected to further edit the parameter.

Figure 16:
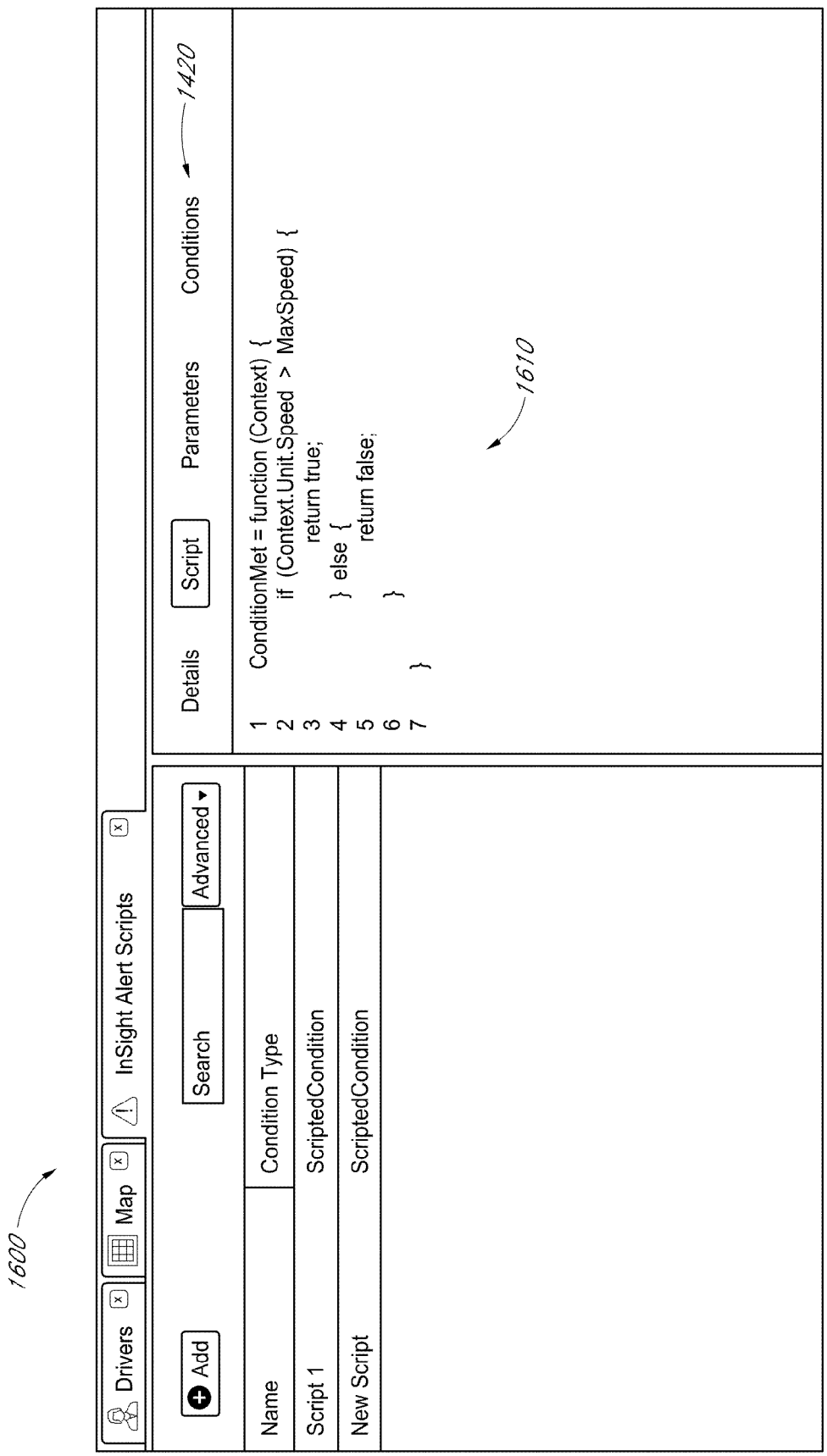

FIG. 16 includes in the user interface 1600 that has a script control for editing conditions and logic of an alert. The script control is highlighted in the menu 1420, and an example script 1610 is shown. A user can edit a script 1610 in this display that enables a user to have highly customized alerts. In the example shown, the script 1610 shows that when a unit or vehicle speed exceeds a maximum speed, then the alert can fire. Scripts can be used to generate more complex alerts, such as any of the alerts described above. Scripts can trigger alerts based on conditional logic used with respect to one, two, three, or more parameters derived from the telematics data.

Figure 17:
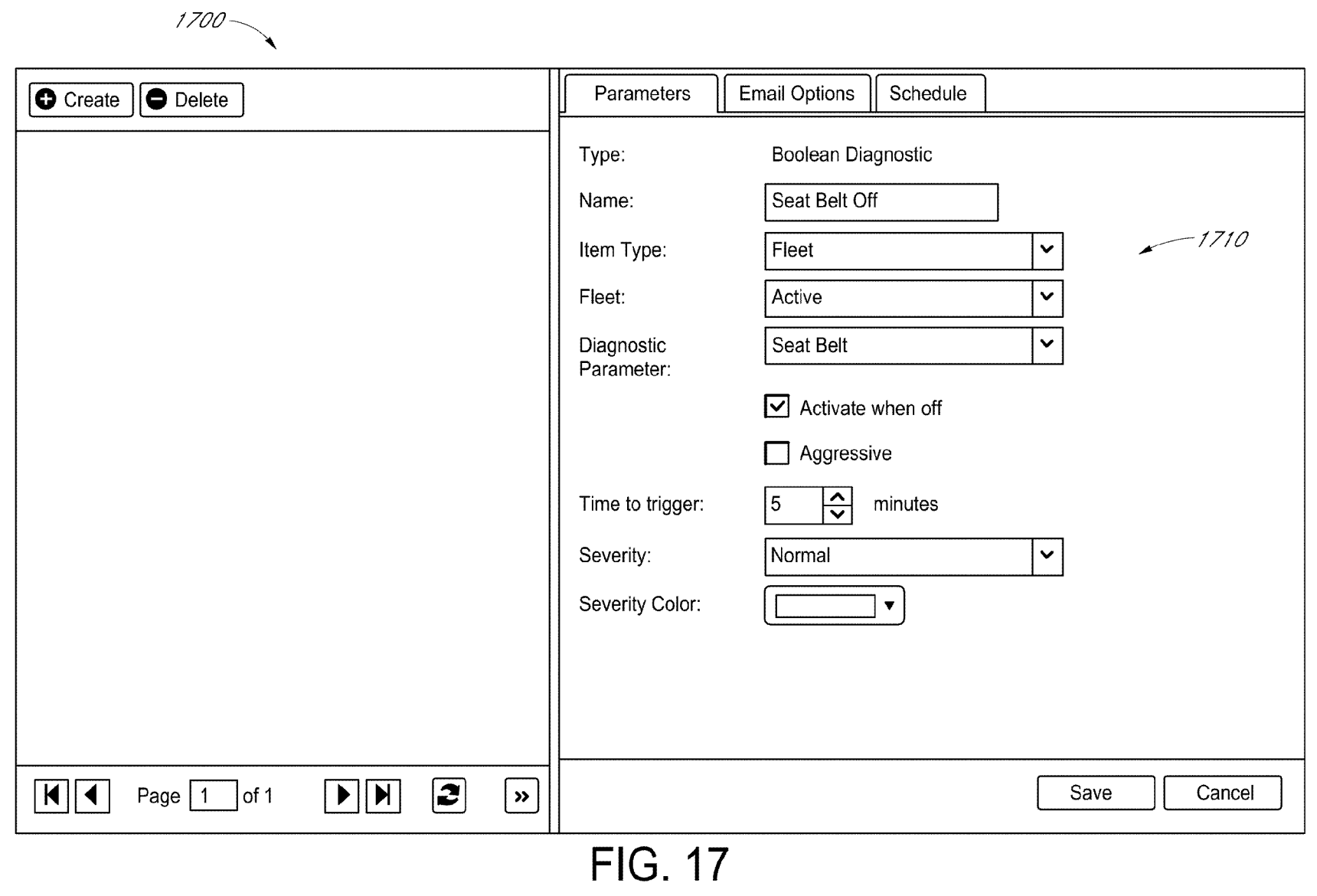

Turning to FIG. 17, another example parameter user interface 1700 is shown that allows a user to edit parameters of an alert using various user interface controls 1710. These parameters include the name of the control or parameter, whether it is a diagnostic parameter, whether to activate or be aggressive with the parameter, the time to trigger the parameter, the severity of the parameter, and a color to associate with the severity of the parameter, among other features.

FIGS. 18 and 19 include user interfaces 1800 and 1900 for editing diagnostic alerts related to diagnostic codes, including analog codes in FIG. 18 and digital codes in FIG. 19. Analog codes in FIG. 18 include some examples shown as rows 1820 in the display. These rows 1820 include such analog codes or analog diagnostic parameters such as acceleration violations, battery voltage, odometer value and so forth. A yellow alert area 1810 and a red alert area 1812 are provided in the user interface 1800 to enable the user to specify whether to enable an alert, whether to specify a minimum and maximum value for each row 1820 or the like. Yellow alerts can be less serious than red alerts and may warrant less immediate attention in some instances than red alerts.

Similar to FIG. 18, the user interface 1900 in FIG. 19 includes rows 1920 to list diagnostic trouble codes and yellow alert and red alert areas 1910 and 1912 of the display to indicate the severity of the alert.

V. Additional Embodiments

In some embodiments, alerts can be used to develop a driver scorecard. More particularly, in certain embodiments alerts on driver or vehicle behavior can be used to create a score for a driver. For example, a driver who speeds more, for example, as indicated by a number of speeding alerts, may have a lower score than other drivers who speed less or who get fewer speeding alerts. Multiple alerts can be evaluated on different parameters to develop the driver score or scorecard. The alerts can therefore be used as data to derive key performance indicators (KPI) on drivers.

The custom alerts module 136 can alert on data other than vehicle parameters in some embodiments. For instance, the custom alerts module 136 can enable alerts to be created on user workflows, routing schedules, and the like. The information regarding workflow can include information related to vehicle routes and driver performance with respect to servicing the vehicle routes. Some examples of such alerts can include alerts on when a driver deviates from a route and alerts for when a driver is running late for a job. These alerts can be derived from the vehicle parameter data together with workflow data in some instances. More detailed examples of such workflow data from which alerts may be derived are described in U.S. application Ser. No. 13/623,834, filed Sep. 20, 2012, titled "Vehicle Fleet Work Order Management System," the disclosure of which is hereby incorporated by reference in its entirety.

Although various user interfaces have been described herein, any subset of these user interfaces can be considered to be a single user interface with multiple displays.

I. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Many of the operations of the presentation analysis service are sufficiently mathematically or technically complex that one or more computing devices may be necessary to carry them out. Thus, the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of enabling users to customize a vehicle management system, the method comprising:
   by a computer system comprising computer hardware:
      outputting a custom report creation user interface for presentation to a user, the custom report creation user interface comprising one or more user interface controls configured to enable a user to create a custom report;
      downloading, from a vehicle management system, a data set related to a vehicle fleet to the computer system;
      receiving a user selection of fields in the data set for inclusion in a custom report template;
      receiving a user selection of layout details with respect to the selected fields, the selected layout details comprising information for organizing a layout of the selected fields in the custom report template;
      outputting a custom alert user interface for presentation to the user, the custom alert user interface configured to enable the user to define a custom alert including conditional logic on a plurality of vehicle parameters obtained from telematics data so that satisfaction of the conditional logic results in an alert message being automatically generated and sent by the vehicle management system to at least one in-vehicle device associated with at least one vehicle of the vehicle fleet for presentation to a vehicle driver;
      receiving a user selection of the plurality of vehicle parameters and a user input of the conditional logic, the selected plurality of vehicle parameters comprising a vehicle diagnostic trouble code and a vehicle location, the input conditional logic indicating to alert when both the vehicle diagnostic trouble code is triggered and the vehicle location is greater than a threshold distance from a site location; and
      uploading the custom report template and the custom alert to the vehicle management system thereby enabling the custom report template to be used by the vehicle management system to run the custom report and the custom alert to be used by the vehicle management system to determine to automatically generate the alert message and send the alert message to a first in-vehicle device associated with a first vehicle of the vehicle fleet when both the vehicle diagnostic trouble code is triggered by the first vehicle and the vehicle location of the first vehicle is greater than the threshold distance from the site location, the custom report template comprising the selected fields of the data set and the selected layout details, the custom alert comprising the selected plurality of vehicle parameters and the input conditional logic.

2. The method of claim 1, wherein the alert message indicates to return the first vehicle to the site location.

3. The method of claim 1, wherein the data set comprises information regarding workflow in the vehicle fleet.

4. The method of claim 3, wherein the information regarding workflow comprises information related to vehicle routes and driver performance with respect to servicing the vehicle routes.

5. The method of claim 1, further comprising outputting a custom terminology user interface configured to enable the user to replace a fleet management term used in the vehicle management system with a custom term so that the custom term is used in place of the fleet management term in (1) at least one user interface output by the computer system for presentation to the user, (2) a database maintained by the vehicle management system, and (3) information output by the in-vehicle device for presentation to the driver.

6. The method of claim 1, wherein the custom alert user interface is configured to enable the user to further define the custom alert to include the conditional logic on (1) the plurality of vehicle parameters and (2) workflow in the vehicle fleet.

7. The method of claim 1, wherein textual contents of the alert message depend at least on the conditional logic.

8. A system for enabling users to customize a vehicle management system, the system comprising:
   processing circuitry comprising physical computer hardware configured to:
      output a custom report creation user interface for presentation to a user, the custom report creation user interface comprising one or more user interface controls configured to enable a user to create a custom report;
      download, from a vehicle management system, a data set related to a vehicle fleet to the processing circuitry;
      receive a user selection of fields in the data set for inclusion in a custom report template;

receive a user selection of layout details with respect to the selected fields, the selected layout details comprising information for organizing a layout of the selected fields in the custom report template;

output a custom alert user interface for presentation to the user, the custom alert user interface configured to enable the user to define a custom alert including conditional logic on a plurality of vehicle parameters obtained from telematics data so that satisfaction of the conditional logic results in an alert message being automatically generated and sent by the vehicle management system to at least one in-vehicle device associated with at least one vehicle of the vehicle fleet for presentation to a vehicle driver;

receive a user selection of the plurality of vehicle parameters and a user input of the conditional logic, the selected plurality of vehicle parameters comprising a vehicle diagnostic trouble code and a vehicle speed, the input conditional logic indicating to alert when both the vehicle diagnostic trouble code is triggered and the vehicle speed is greater than a threshold speed; and upload the custom report template and the custom alert to the vehicle management system thereby enabling the custom report template to be used by the vehicle management system to run the custom report and the custom alert to be used by the vehicle management system to determine to automatically generate the alert message and send the alert message to a first in-vehicle device associated with a first vehicle of the vehicle fleet when both the vehicle diagnostic trouble code is triggered by the first vehicle and the vehicle speed of the first vehicle is greater than the threshold speed, the custom report template comprising the selected fields of the data set and the selected layout details, the custom alert comprising the selected plurality of vehicle parameters and the input conditional logic.

9. The system of claim 8, wherein the alert message indicates to bring the first vehicle to a site location.

10. The system of claim 8, wherein the data set comprises information regarding workflow in the vehicle fleet.

11. The system of claim 10, wherein the information regarding workflow comprises information related to vehicle routes and driver performance with respect to servicing the vehicle routes.

12. The system of claim 8, wherein the processing circuitry is configured to output a custom terminology user interface configured to enable the user to replace a fleet management term used in the vehicle management system with a custom term so that the custom term is used in place of the fleet management term in (1) at least one user interface output by the computer system for presentation to the user, (2) a database maintained by the vehicle management system, and (3) information output by the in-vehicle device for presentation to the driver.

13. The system of claim 8, wherein the custom alert user interface is configured to enable the user to further define the custom alert to include the conditional logic on (1) the plurality of vehicle parameters and (2) workflow in the vehicle fleet.

14. The system of claim 8, wherein textual contents of the alert message depend at least on the conditional logic.

15. Non-transitory physical computer storage comprising instructions stored thereon for implementing, in one or more processors, a method of enabling users to customize a vehicle management system, the method comprising:

outputting a custom report creation user interface for presentation to a user, the custom report creation user interface comprising one or more user interface controls configured to enable a user to create a custom report;

downloading, from a vehicle management system, a data set related to a vehicle fleet to a user computer;

receiving a user selection of fields in the data set for inclusion in a custom report template;

receiving a user selection of layout details with respect to the selected fields, the selected layout details comprising information for organizing a layout of the selected fields in the custom report template;

outputting a custom alert user interface for presentation to the user, the custom alert user interface configured to enable the user to define a custom alert including conditional logic on a plurality of vehicle parameters obtained from telematics data so that satisfaction of the conditional logic results in an alert message being automatically generated and sent by the vehicle management system to at least one in-vehicle device associated with at least one vehicle of the vehicle fleet for presentation to a vehicle driver;

receiving a user selection of the plurality of vehicle parameters and a user input of the conditional logic, the selected plurality of vehicle parameters comprising a vehicle diagnostic trouble code and a vehicle location, the input conditional logic indicating to alert when both the vehicle diagnostic trouble code is triggered and the vehicle location is greater than a threshold distance from a site location; and uploading the custom report template and the custom alert to the vehicle management system thereby enabling the custom report template to be used by the vehicle management system to run the custom report and the custom alert to be used by the vehicle management system to determine to automatically generate the alert message and send the alert message to a first in-vehicle device associated with a first vehicle of the vehicle fleet when both the vehicle diagnostic trouble code is triggered by the first vehicle and the vehicle location of the first vehicle is greater than the threshold distance from the site location, the custom report template comprising the selected fields of the data set and the selected layout details, the custom alert comprising the selected plurality of vehicle parameters and the input conditional logic.

16. The non-transitory physical computer storage of claim 15, further comprising outputting a custom terminology user interface configured to enable the user to replace a fleet management term used in the vehicle management system with a custom term so that the custom term is used in place of the fleet management term in (1) at least one user interface output by the computer system for presentation to the user, (2) a database maintained by the vehicle management system, and (3) information output by the in-vehicle device for presentation to the driver.

17. The non-transitory physical computer storage of claim 15, wherein the custom alert user interface is configured to enable the user to further define the custom alert to include the conditional logic on (1) the plurality of vehicle parameters and (2) workflow in the vehicle fleet.

18. The non-transitory physical computer storage of claim 15, wherein the textual contents of the alert message depend at least on the conditional logic.

19. The non-transitory physical computer storage of claim 15, wherein the alert message indicates to return the first vehicle to the site location.

* * * * *